US009676468B1

(12) United States Patent
Roach (10) Patent No.: US 9,676,468 B1
(45) Date of Patent: Jun. 13, 2017

(54) ALUMINIZED PARACHUTE AS SOLAR SHIELD

(71) Applicant: X Development LLC, Mountain View, CA (US)

(72) Inventor: Kevin Roach, Boulder Creek, CA (US)

(73) Assignee: X Development LLC, Mountain View, CA (US)

( * ) Notice: Subject to any disclaimer, the term of this patent is extended or adjusted under 35 U.S.C. 154(b) by 249 days.

(21) Appl. No.: 14/514,610

(22) Filed: Oct. 15, 2014

Related U.S. Application Data

(60) Provisional application No. 61/918,840, filed on Dec. 20, 2013.

(51) Int. Cl.
*B64B 1/48* (2006.01)
*B64B 1/58* (2006.01)
*B64D 17/80* (2006.01)

(52) U.S. Cl.
CPC ............... *B64B 1/58* (2013.01); *B64D 17/80* (2013.01)

(58) Field of Classification Search
CPC .... B64B 1/02; B64B 1/04; B64B 1/40; B64B 1/58; B64B 1/60; B64B 1/48; B64D 17/80
See application file for complete search history.

(56) References Cited

U.S. PATENT DOCUMENTS

| 1,553,340 | A | * | 9/1925 | Upson | B64B 1/40 244/31 |
| 1,569,391 | A | * | 1/1926 | Sussna | B64D 25/12 244/139 |
| 2,415,818 | A | * | 2/1947 | Frieder | B64B 1/40 244/32 |
| 3,154,268 | A | * | 10/1964 | Struble, Jr. | B64B 1/40 244/142 |

(Continued)

FOREIGN PATENT DOCUMENTS

| DE | 102007006048 | * | 8/2008 | ............... D06N 7/04 |
| WO | 95/04407 A1 | | 2/1995 | |

OTHER PUBLICATIONS

Schaller et al. "Hindered amine light stabilizers in pigmented coatings", 2009.*

(Continued)

*Primary Examiner* — Brian M O'Hara
*Assistant Examiner* — Assres H Woldemaryam
(74) *Attorney, Agent, or Firm* — Lerner, David, Littenberg, Krumholz & Mentlik, LLP (57) ABSTRACT

Aspects of the disclosure relate to fabricating high-altitude balloons having a prebuilt parachute overlying the surface of the balloon envelope to handle catastrophic envelope failures. The balloon envelope is formed from a number of gore panels. Tendons are positioned adjacent to corresponding ones of the gore panels. Each tendon is configured to carry a load caused by pressurized lifting gas within the balloon (Continued)

envelope. The parachute is affixed to at least some of the tendons, and covers at least a portion of the balloon envelope adjacent to the apex of the envelope. The parachute may be sewn onto the tendons. An outer surface of the parachute is covered with a UV-protective material. For instance, an aluminum coating may be vapor-deposited onto the parachute's outer surface. An IR-reflective material may cover an inner surface of the parachute.

20 Claims, 9 Drawing Sheets

(56) References Cited

U.S. PATENT DOCUMENTS

| | | | | |
|---|---|---|---|---|
| 3,508,725 | A | * | 4/1970 | Nebiker .................. B64D 1/00 244/138 R |
| 3,670,993 | A | * | 6/1972 | Kay .......................... F23D 14/66 244/32 |
| 3,679,155 | A | * | 7/1972 | Centofanti ............. B64D 17/78 244/32 |
| 4,174,082 | A | * | 11/1979 | Eshoo ...................... B64B 1/58 244/31 |
| 5,149,019 | A | | 9/1992 | Stenlund |
| 5,940,023 | A | | 8/1999 | Hintzke et al. |
| 5,967,459 | A | * | 10/1999 | Hayashi .................... B64B 1/06 244/152 |
| 6,056,241 | A | | 5/2000 | Kasher |
| 6,628,941 | B2 | | 9/2003 | Knoblach et al. |
| 7,801,522 | B2 | | 9/2010 | Knoblach et al. |
| 2005/0040290 | A1 | * | 2/2005 | Suhami ................... B64D 17/66 244/146 |
| 2006/0063529 | A1 | * | 3/2006 | Seligsohn ................. B64B 1/44 455/431 |
| 2008/0078883 | A1 | * | 4/2008 | de Jong .................. B64G 1/222 244/158.3 |
| 2009/0114768 | A1 | * | 5/2009 | Voorhees ................. B64B 1/58 244/97 |
| 2010/0012772 | A1 | * | 1/2010 | Izutsu ....................... B64B 1/44 244/31 |
| 2014/0367511 | A1 | | 12/2014 | Knoblach et al. |

OTHER PUBLICATIONS

Patent DE102007006048A1—English translation.*
"Aluminum-reflective-coatings", IMPhotonix.*
A. L. Morris. "Scientific Ballooning Handbook." NCAR Technical Note. Atmospheric Technology Division, National Center for Atmospheric Research. May 1975, 258 pages.
Deng, "Clefted Equilibrium Shapes of Superpressure Balloon Structures", 2012.
Jones et al., "Montgolfiere Balloon Missions for Mars and Titan", 2005.
P. G. Scott et al. "Long Duration Balloon Technology Survey." Final Report: Report No. WII-9942-01-TR-01. Wizen International, Inc. Mar. 11, 1989, 66 pages. Retrieved from: <http://www.dtic.mil/dtic/tr/fulltext/u2/a206975.pdf>.
U.S. Department of Transportation, "Balloon Flying Handbook", Federal Aviation Administration, Flight Standards Service, 2008.
Winker, "Pumpkins and Onions and Balloon Design", Adv. Space Res., vol. 30, No. 5, pp. 1199-1204, 2002.
Yajima, "A New Design and Fabrication Approach for Pressurized Balloon", Adv. Space Re., vol. 26, No. 9, pp. 1357-1360, 2000.

* cited by examiner

FIG. 8

ALUMINIZED PARACHUTE AS SOLAR SHIELD

CROSS-REFERENCE TO RELATED APPLICATIONS

The present application claims the benefit of the filing date of U.S. Provisional Patent Application No. 61/918,840 filed Dec. 20, 2013 the entire disclosure of which is hereby incorporated herein by reference.

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly.

Some systems may provide network access to remote locations or to locations with limited networking infrastructure via a balloon network operating in the stratosphere. The balloons may be made of a flexible envelope material configured in sections or lobes to create a "pumpkin"-type or lobed balloon. Due to extreme environmental and other conditions, the balloon may fail. In case of failure, a parachute may be employed to control the descent of the balloon. Unfortunately, in some situations, the balloon failure itself may damage or otherwise render the parachute unworkable.

SUMMARY

Aspects of the disclosure provide a balloon-based system that alleviates the risk of catastrophic envelope failure while maintaining a safe descent rate of the balloon, employing a parachute onto the surface of the balloon's envelope.

According to one aspect, a balloon structure comprises a plurality of gore panels, a plurality of tendons and a parachute. The plurality of gore panels are affixed to one another to form a balloon envelope, each gore panel comprising a film, a first end of each gore panel terminating at a top member along an apex of the balloon envelope, and a second end of each gore panel terminating at a base member along a bottom of the balloon envelope. Each tendon is positioned adjacent a corresponding one of the plurality of gore panels, with each tendon being configured to carry a load caused by pressurized lifting gas within the balloon envelope. The parachute is affixed to at least some of the plurality of tendons, the parachute covering at least a portion of the balloon envelope adjacent the apex thereof.

In one scenario, the parachute is sewn onto at least some of the plurality of tendons.

In another scenario, an outer surface of the parachute facing away from the balloon envelope includes a UV-protective material. The UV-protective material may include an aluminum coating. Alternatively, the UV-protective material comprises a UV blocker or a UV absorber. In a further alternative, the UV protective material comprises a hindered amine light stabilizer. Optionally, an inner surface of the parachute arranged adjacent to the balloon envelope includes an IR-reflective material. In this case, the IR-reflective material on the inner surface of the parachute may be a reflective metallic layer. Here, the reflective metallic layer may be a deposited aluminum layer.

According to another aspect, a method of manufacturing a balloon structure is provided. The method comprises preparing one or more gore panels on a work area, each gore panel comprising a film; securing adjacent gore panels to one another to form a balloon envelope, a first end of each gore panel terminating at an apex of the balloon envelope, and a second end of each gore panel terminating at a base of the balloon envelope; securing a plurality of tendons to the balloon envelope, each tendon being positioned adjacent a corresponding one of the plurality of gore panels, each tendon being configured to carry a load caused by pressurized lifting gas within the balloon envelope; and affixing the parachute to at least some of the plurality of tendons, the parachute covering at least a portion of the balloon envelope adjacent the apex thereof, an outer surface of the parachute facing away from the balloon envelope and an inner surface of the parachute being arranged adjacent to the balloon envelope.

In one example, the parachute is affixed by being sewn onto the at least some of the plurality of tendons. In another example, the method further comprises applying a UV-protective material to the outer surface of the parachute. The UV-protective material may comprise an aluminum coating. In this case, applying the UV-protective material may be done by vacuum depositing an aluminum coating onto the outer surface of the parachute.

In another example, the UV-protective material comprises a UV blocker or a UV absorber. Alternatively, the UV protective material comprises a hindered amine light stabilizer. In yet another example, the method further comprises applying an IR-reflective material to the inner surface of the parachute. In this case, applying the IR-reflective material may be done by vacuum depositing an aluminum coating onto the inner surface of the parachute. In a further example, the inner surface of the parachute incorporates an IR-reflective material. And in this case, the IR-reflective material may comprise is a reflective metallic layer.

DETAILED DESCRIPTION

Overview

The technology relates generally to fabricating balloon envelopes for use with high-altitude balloons in a communications network. More particularly, the technology pertains to handling a catastrophic failure of the envelope during operation of the balloon.

One way to deal with a catastrophic material failure is to employ a system at the apex of the balloon envelope that includes a main parachute, a drogue parachute and a redundant cut-down assembly. The main parachute may only be used in the event of a catastrophic failure to control the rate of descent of the balloon. It is possible to utilize the envelope itself as a parachute, which would enable removal of the main parachute. However, in the case of an envelope failure, for instance due to a burst, the failure itself might shred or otherwise damage the envelope parachute, causing a rapid descent.

A pumpkin-type or lobed balloon is typically formed from multiple thin film envelope lobes ("gores"). Adjacent gore edges are connected to each other, for instance using an adhesive sealant. Tendons positioned on centerlines of the envelope gores may be used to carry the load caused by pressurized lifting gas within the balloon envelope. An envelope may fail in one of three ways. These are a seam failure, a film failure, and a tendon snap.

A seam failure will usually result in a non-catastrophic leak. The gore film may fail at a point of highest strain, which is usually on the largest lobe at or near the equator of the envelope. If a tendon snaps, the underlying restrained lobe (gore) will bulge out, and the envelope will fail, also at or near the equator. These latter two situations will most likely result in a catastrophic failure of the envelope.

The technology discussed herein provides a parachute prebuilt onto the surface of the balloon envelope. In the event of a catastrophic failure of the envelope, the parachute is automatically deployed. Before going into the specifics of this, a discussion of an overall balloon system is provided.

Example Balloon Systems

Figure 1:
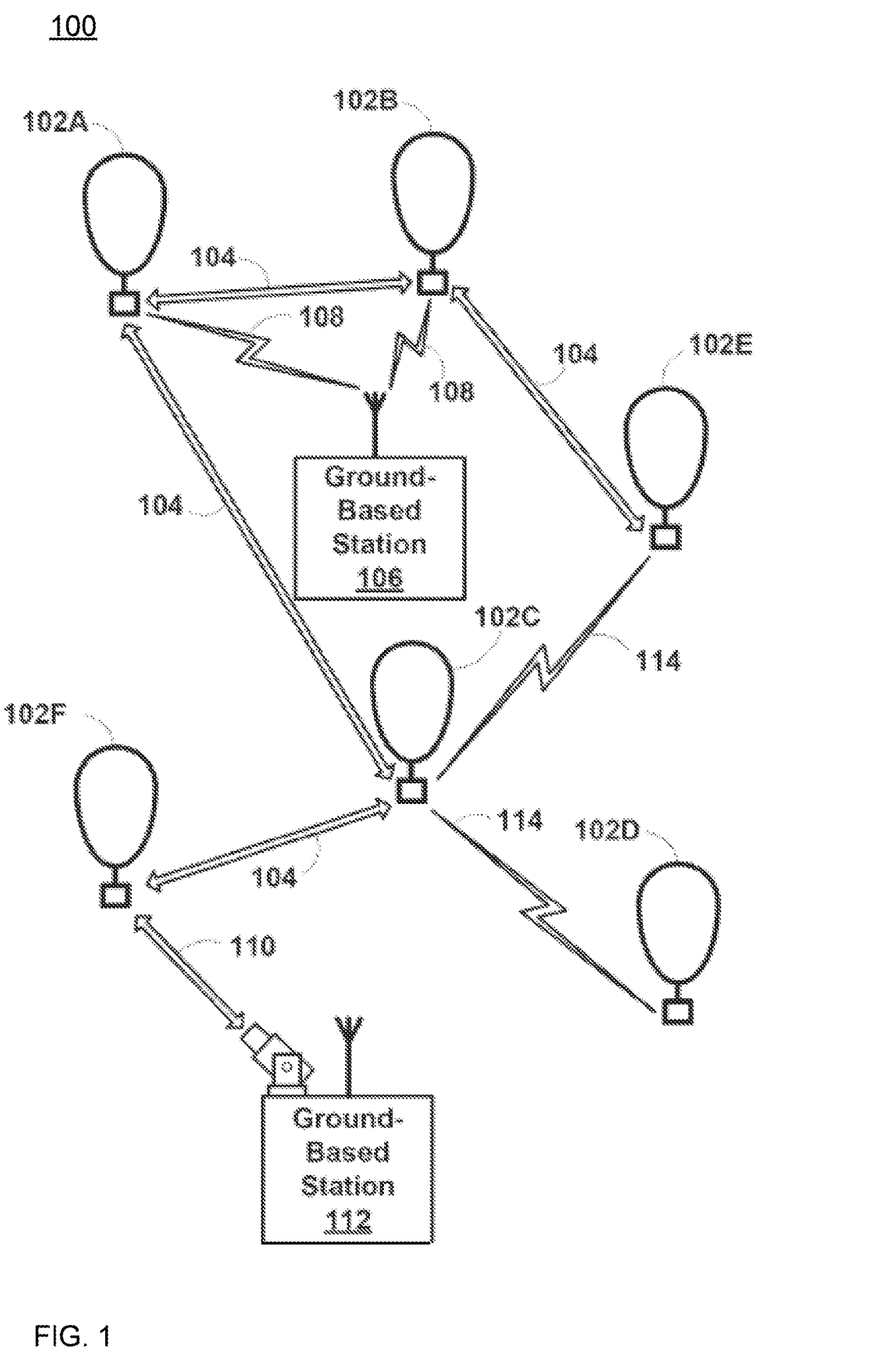
FIG. 1 is a functional diagram of an example system in accordance with aspects of the disclosure.

FIG. 1 depicts an example system 100 in which the balloons described above may be used. This example should not be considered as limiting the scope of the disclosure or usefulness of the features described herein. System 100 may be considered a "balloon network." In this example, balloon network 100 includes a plurality of devices, such as of balloons 102A-F as well as ground-base stations 106 and 112. Balloon network 100 may also include a plurality of additional devices, such as various computing devices (not shown) as discussed in more detail below.

The devices in system 100 are configured to communicate with one another. As an example, the balloons may include free-space optical links 104 and/or radiofrequency (RF) links 114 in order to facilitate intra-balloon communications. In this way Balloons 102A-F may collectively function as a mesh network for packet data communications. At least some of balloons 102A-B may be configured for RF communications with ground-based stations 106 and 112 via respective RF links 108. Some balloons, such as balloon 102F, could be configured to communicate via optical link 110 with ground-based station 112.

A given balloon 102 may be configured to transmit an optical signal via an optical link 104. In one example, the given balloon 102 may use one or more high-power light-emitting diodes (LEDs) to transmit an optical signal. Alternatively, some or all of the balloons 102 may include laser systems for free-space optical communications over the optical links 104. Other types of free-space optical communication are possible. Further, in order to receive an optical signal from another balloon via an optical link 104, the balloon may include one or more optical receivers.

As noted above, one or more balloons may also utilize one or more of various different RF air-interface protocols for communication with ground-based stations via respective RF links. For instance, some or all of balloons 102A-F may be configured to communicate with ground-based stations 106 and 112 via RF links 108 using various protocols described in IEEE 802.11 (including any of the IEEE 802.11 revisions), cellular protocols such as GSM, CDMA, UMTS, EV-DO, WiMAX, and/or LTE, and/or one or more propriety protocols developed for balloon-ground RF communication, among other possibilities.

In some examples, the RF links may not provide a desired link capacity for balloon-to-ground communications. For instance, increased capacity may be desirable to provide backhaul links from a ground-based gateway. Accordingly, an example network may also include downlink balloons, which could provide a high-capacity air-ground link between the various balloons of the network and the ground-base stations. For example, in balloon network 100, balloon 102F may be configured as a downlink balloon.

Like other balloons in network 100, downlink balloon 102F may be operable for optical communication with other balloons via optical links 104. However, downlink balloon 102F may also be configured for free-space optical communication with ground-based station 112 via an optical link 110. Optical link 110 may therefore serve as a high-capacity link (as compared to an RF link 108) between the balloon network 100 and the ground-based station 112. Downlink balloon 102F may additionally be operable for RF communication with ground-based stations 106. In other cases, downlink balloon 102F may only use an optical link for balloon-to-ground communications. Further, while the arrangement shown in FIG. 1 includes just one downlink balloon 102F, an example balloon network can also include multiple downlink balloons. On the other hand, a balloon network can also be implemented without any downlink balloons.

A downlink balloon may be equipped with a specialized, high bandwidth RF communication system for balloon-to-ground communications, instead of, or in addition to, a free-space optical communication system. The high bandwidth RF communication system may take the form of an ultra-wideband system, which may provide an RF link with substantially the same capacity as one of the optical links 104.

In a further example, some or all of balloons 102A-F could be configured to establish a communication link with space-based satellites in addition to, or as an alternative to, a ground based communication link. In some embodiments, a balloon may communicate with a satellite via an optical link. However, other types of satellite communications are possible.

As noted above, the balloons 102A-F may collectively function as a mesh network. More specifically, since balloons 102A-F may communicate with one another using free-space optical links, the balloons may collectively function as a free-space optical mesh network. In a mesh-network configuration, each balloon may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

The network topology may change as the balloons move relative to one another and/or relative to the ground. Accordingly, the balloon network 100 may apply a mesh protocol to update the state of the network as the topology of the network changes. For example, to address the mobility of the balloons 102A to 102F, the balloon network 100 may employ and/or adapt various techniques that are employed in mobile ad hoc networks (MANETs). Other examples are possible as well.

The balloon network may be configured as a "transparent" mesh network, as an "opaque" mesh network, or both. In a transparent balloon network, the balloons may include components for physical switching that is entirely optical, without any electrical components involved in the physical routing of optical signals. Thus, in a transparent configuration with optical switching, signals travel through a multi-hop lightpath that is entirely optical. In an opaque configuration, some or all of the balloons may use optical-electrical-optical (OEO) switching. For example, some or all balloons may include optical cross-connects (OXCs) for OEO conversion of optical signals.

Balloon network 100 may also implement station-keeping functions to help provide a desired network topology. For example, station-keeping may involve each balloon 102A-F maintaining and/or moving into a certain position relative to one or more other balloons in the network (and possibly in a certain position relative to the ground). As part of this process, each balloon may implement station-keeping functions to determine its desired positioning within the desired topology, and if necessary, to determine how to move to the desired position.

The desired topology may vary depending upon the particular implementation and whether or not the balloons are continuously moving. In some cases, balloons may implement station-keeping to provide a substantially uniform topology where the balloons function to position themselves at substantially the same distance (or within a certain range of distances) from adjacent balloons in the balloon network 100. Alternatively, the balloon network 100 may have a non-uniform topology where balloons are distributed more or less densely in certain areas, for various reasons. As an example, to help meet the higher bandwidth demands, balloons may be clustered more densely over areas with greater demand (such as urban areas) and less densely over areas with lesser demand (such as over large bodies of water). In addition, the topology of an example balloon network may be adaptable allowing balloons to adjust their respective positioning in accordance with a change in the desired topology of the network.

Figure 2:
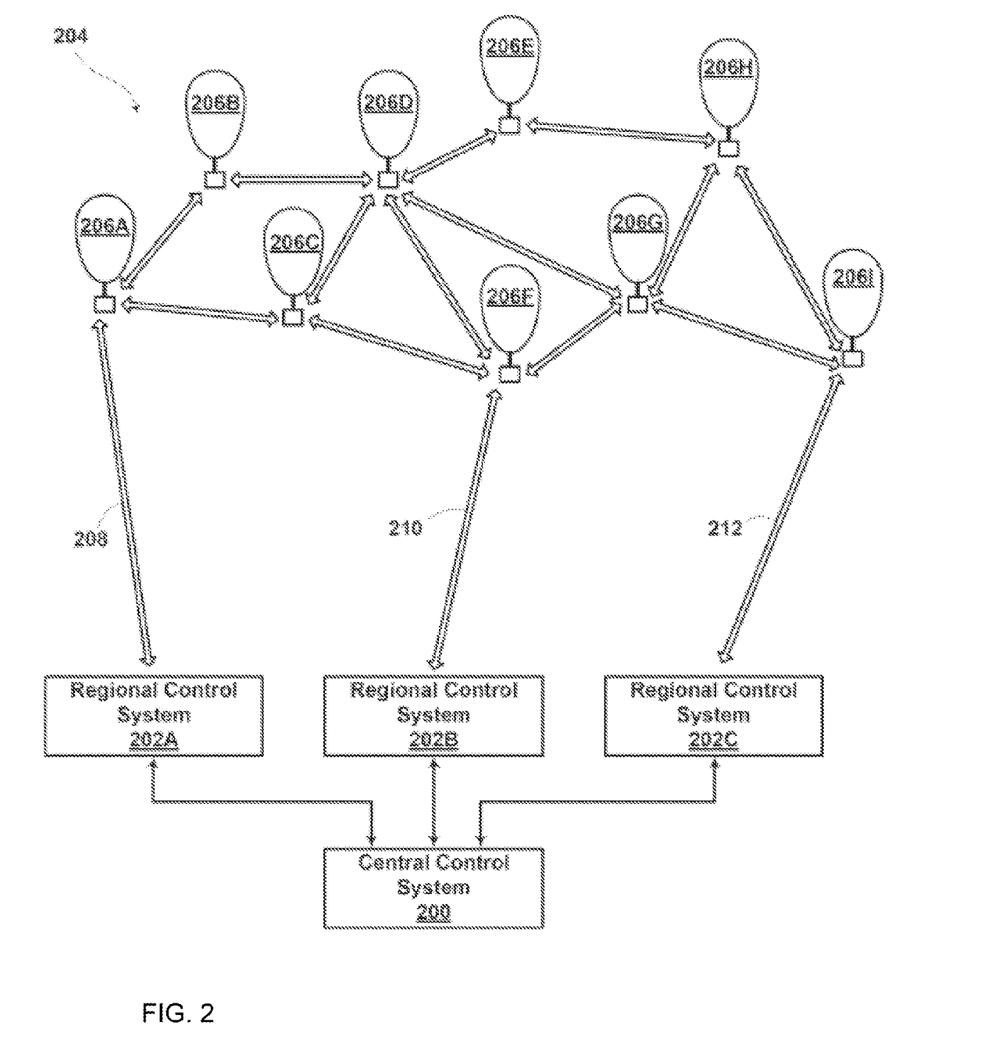
FIG. 2 is another functional diagram of an example system in accordance with aspects of the disclosure.

The mesh networking and/or station-keeping functions may be centralized to control by a designated controller balloon (which aggregates information received from other balloons and sends station-keeping instructions to all other balloons in the balloon network) or by a ground-based station. For example, FIG. 2 depicts a distributed control system, which includes a central control system 200 and a number of regional control-systems 202A and 202B. In this example, regional control systems 202A-C may represent one or more ground-based stations, such as ground-based station 112 of FIG. 1, which is configured to communicate with downlink balloons. Such a control system may be configured to coordinate certain functionality for balloon network 204 (which may be configured the same or similarly to balloon network 100), and as such, may be configured to control and/or coordinate certain functions for balloons 206A-I.

In the example of FIG. 2, central control system 200 may be configured to communicate with balloons 206A-I via a number of regional control systems 202A-C. These regional control systems may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A-C and central control system 200, regional control system 202B may relay communications and/or data between balloons 206D-F and central control system 200, and regional control system 202C may relay communications and/or data between balloons 206G-I and central control system 200.

As with FIG. 1, in order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A-C may respectively communicate with balloons 206A, 206F, and 206I via optical links 206, 208, and 210, respectively.

In a centralized control arrangement, such as that shown in FIG. 2, the central control system 200 (and possibly regional control systems 202A to 202C as well) may coordinate certain mesh-networking functions for balloon network 204. For example, balloons 206A-I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A-I in order to determine an overall state of the network.

Alternatively, control and/or coordination of a balloon network may be de-centralized. For example, each balloon may relay state information to, and receive state information from, some or all nearby balloons. Furthermore, each balloon may relay state information that it receives from a nearby balloon to some or all nearby balloons. When all balloons do so, each balloon may be able to individually determine the state of the network.

The balloons of FIGS. 1 and 2 may be high-altitude balloons that are deployed in the stratosphere. As an example, in a high altitude balloon network, the balloons may generally be configured to operate at altitudes between 18 km and 25 km in order to limit the balloons' exposure to high winds and interference with commercial flights. In order for the balloons to provide a reliable mesh network in the stratosphere, where winds may affect the locations of the various balloons in an asymmetrical manner, the balloons may be configured to move latitudinally and/or longitudinally relative to one another by adjusting their respective altitudes, such that the wind carries the respective balloons to the respectively desired locations.

Figure 3:
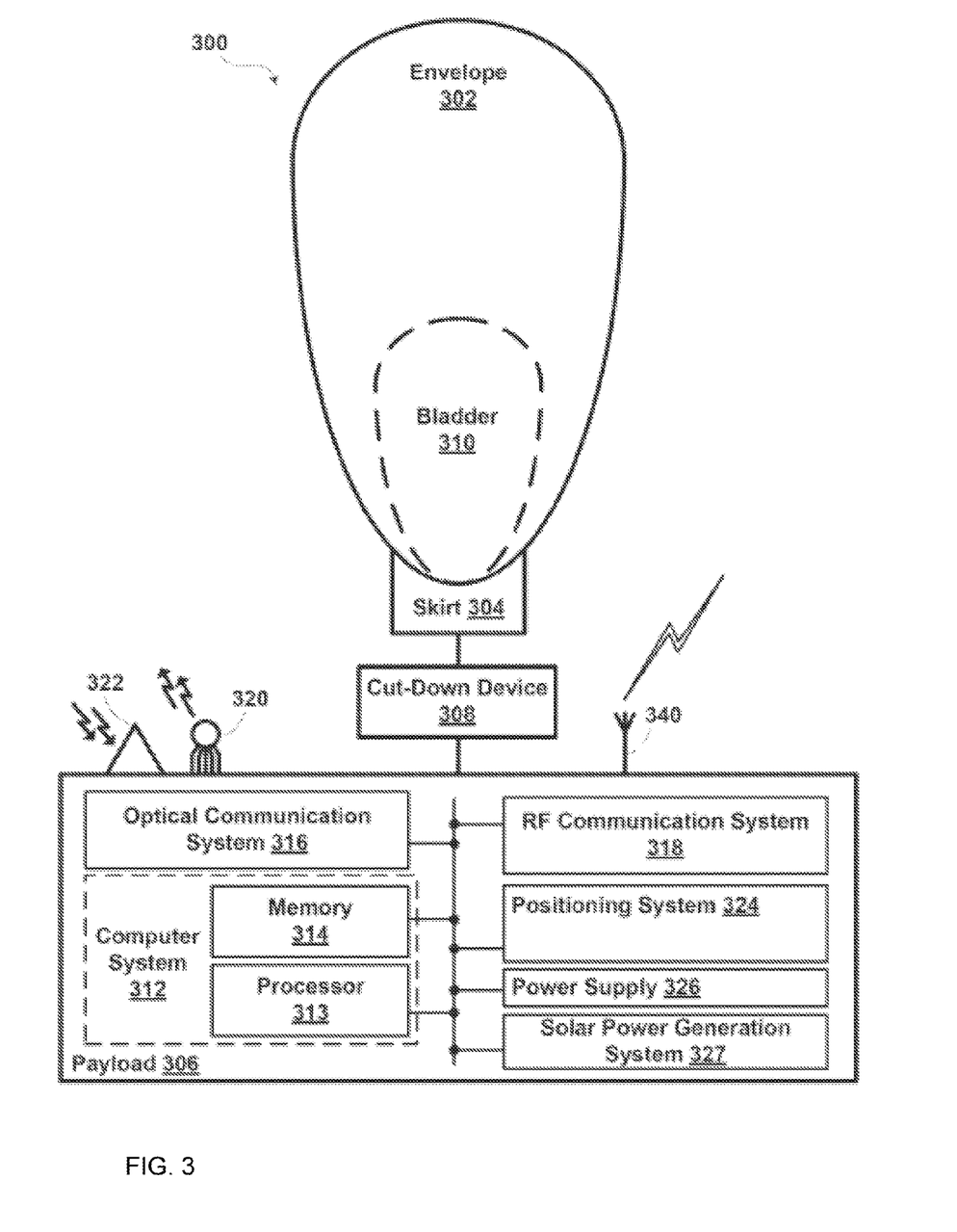
FIG. 3 is an example balloon and payload arrangement in accordance with aspects of the disclosure.

In addition to the communication components described above, in example configurations the high altitude balloons include an envelope and a payload, along with various other components. FIG. 3 is one example of a high-altitude balloon 300, which may represent any of the balloons of FIGS. 1 and 2. As shown, the balloon 300 includes an envelope 302, a skirt 304, a payload 306 and a cut-down device 308.

The envelope 302 and skirt 304 may take various forms. For instance, the envelope 302 and/or skirt 304 may be made of materials such as biaxially-oriented polyethylene terephthalate ("BoPET"). Additionally, or alternatively, some or all of the envelope 302 and/or skirt 304 may be constructed from a highly-flexible latex material or rubber material such as chloroprene. Other materials or combinations thereof may also be employed. Furthermore, the shape and size of the envelope 302 and skirt 304 may vary depending upon the particular implementation. Additionally, the envelope 302 may be filled with different types of gases, such as helium and/or hydrogen. Other types of gases, and combinations thereof, are possible as well.

In the present example, the payload 306 of balloon 300 includes a computer system 312 having one or more processors 313 and on-board data storage in the form of memory 314. Memory 314 of computer system 312 stores information accessible by the processor(s) 313, including instructions that can be executed by the processor. The memory 314 also includes data that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions can be any set of instructions to be executed directly, such as machine code, or indirectly, such as scripts, by the processor. In that regard, the terms "instructions," "application," "steps" and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The data can be retrieved, stored or modified by the one or more processors 313 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 313 can include any conventional processors, such as a commercially available CPU. Alternatively, each processor can be a dedicated component such as an ASIC or other hardware-based processor. Although FIG. 3 functionally illustrates the processor(s) 313, memory 314, and other elements of computer system 312 as being within the same block, the system can actually comprise multiple processors, computers, computing devices, and/or memories that may or may not be stored within the same physical housing. For example, the memory can be a hard drive or other storage media located in a housing different from that of computer system 312. Accordingly, references to a processor, computer, computing device, or memory will be understood to include references to a collection of processors, computers, computing devices, or memories that may or may not operate in parallel.

The payload 306 of balloon 300 may also include various other types of equipment and systems to provide a number of different functions. For example, as shown payload 306 includes an optical communication system 316, which may transmit optical signals via an ultra-bright LED system 320, and which may receive optical signals via an optical-communication receiver 322 (e.g., a photodiode receiver system). In this regard, optical communication system 316 and optical-communication receiver 322 may facilitate optical links 104 and/or 110 as shown in FIG. 1. Furthermore, payload 306 may also include an RF communication system 318, which transmits and/or receives RF communications via an antenna system 340. In this regard, RF communication system 318 and antenna system 340 may facilitate RF links 108 and/or 114 as shown in FIG. 1.

The payload 306 is illustrated as also including a power supply 326 to supply power to the various components of balloon 300. The power supply 326 could include a rechargeable battery. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses). The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, the variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could also be used to improve balloon stability.

As noted above, the envelope 302 may be filled with various gasses such as helium, hydrogen or any other lighter-than-air material. The envelope 302 could thus have an associated upward buoyancy force. Thus, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

Alternatively, the envelope 302 could be substantially rigid and include an enclosed volume. Air could be evacuated from envelope 302 while the enclosed volume is substantially maintained. In other words, a least a partial vacuum could be created and maintained within the enclosed volume. Thus, the envelope 302 and the enclosed volume could become lighter-than-air and provide a buoyancy force. In yet other embodiments, air or another material could be controllably introduced into the partial vacuum of the enclosed volume in an effort to adjust the overall buoyancy force and/or to provide altitude control.

A portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Payload 306 may include a navigation system (not shown) separate from, or partially or fully incorporated into computer system 312. The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground based or satellite based control system and communicated to the high-altitude balloon. In other embodiments, specific may be configured to compute altitudinal adjustments for other balloons and transmit the adjustment commands to those other balloons.

Figure 4:
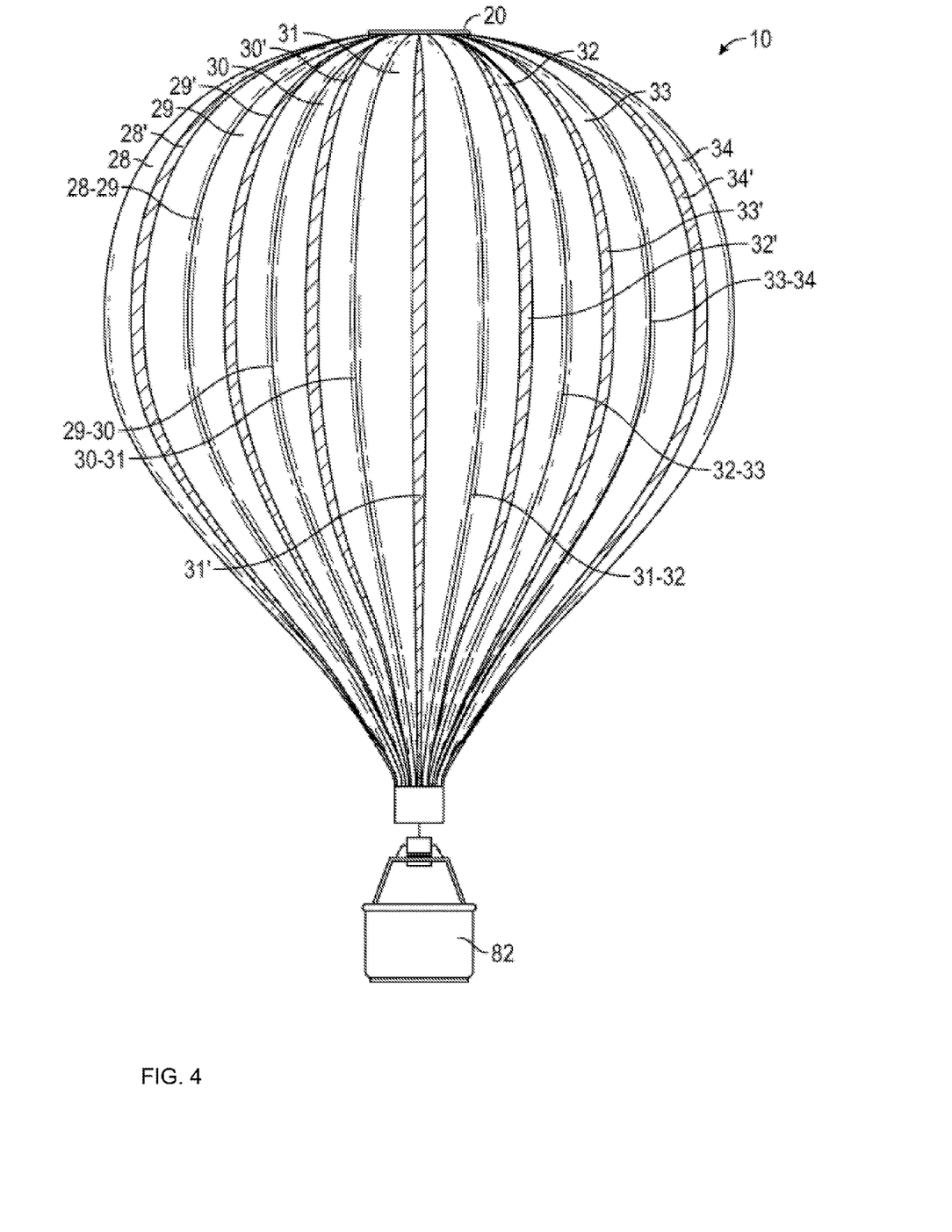
FIG. 4 is another example balloon and payload arrangement in accordance with aspects of the disclosure.

FIG. 4 is an example configuration of an envelope 10 of a pumpkin-type balloon, which may be one implementation of the balloon 300. As shown, attached to balloon 10 is payload 82 that may represent payload 306 of FIG. 3. In view of the goal of making the balloon envelope 10 as lightweight as possible, the balloon envelope is comprised of a plurality of envelope lobes or gores comprised of a thin film, such as polyethylene or polyethylene terephthalate, which is lightweight yet has suitable strength properties for use as a balloon envelope.

In this example, balloon envelope 10 is comprised of multiple envelope gores and tendons. As shown, envelope gore 30 is attached to adjacent envelope 31 at edge seam 30-31 and to adjacent envelope gore 29 at edge seam 29-30. Envelope gore 28 is shown attached to envelope gore 29 at edge seam 28-29. Envelope gore 32 is shown attached to adjacent envelope gore 31 at edge seam 31-32 and to adjacent envelope gore 33 at edge seam 32-33. Envelope gore 34 is shown attached to envelope gore 33 at edge seam 33-34. The edge seams between adjacent envelope gores may be formed by heat sealing, although other means of attachment that provide for an air tight seal between adjacent envelope gores may also be used. In one example, the envelope gores are comprised of polyethylene having a thickness of 1.5 to 2 mils. In another example, the material film has a thickness of between 1 to 5 mils. Each of the respective envelope gores extend to balloon apex having a top member 20.

The individual envelope gores 28-34 may be shaped so that the length of the edge seam connecting adjacent envelope gores is greater than the length of a centerline of the envelope gores. Thus, the envelope gores may be shaped to better optimize the strain rate experienced by the balloon envelope. The pressurized lifting gas within the balloon envelope 10 may cause a force or load to be applied to the balloon envelope. Tendons, such as load tapes or straight fiber cables, may be used to provide strength to the balloon envelope and to help withstand the load created by the pressurized gas within the balloon envelope.

In the present example, a tendon 28' is shown positioned on a centerline of envelope gore 28, a tendon 29' is shown positioned on a centerline of envelope gore 29, a tendon 30' is shown positioned on a centerline of envelope gore 30, a tendon 31' is shown positioned on a centerline of envelope gore 31, a tendon 32' is shown positioned on a centerline of envelope gore 32, a tendon 33' is shown positioned on a centerline of envelope gore 33, and a tendon 34' is shown positioned on a centerline of envelope gore 34.

Furthermore, the individual gores 28-34 are shaped so that the length of the edge seam connecting adjacent gores is greater than the length of the centerline of the gores. Therefore, when inflated, there is an excess of envelope material (that includes the edge seams between the adjacent envelope gores) that bulges out somewhat before there is any strain on the envelope material. Therefore, the load is instead applied to the shortest section of the gore—the centerline of the adjacent gores 28-34 where the longitudinal tendons 28'-34' are applied. Thus, the balloon envelope 10 takes on more of a pumpkin shape with the edge seams 28-29, 29-30, 30-31, 31-32, 32-33, and 33-34 of the respective envelope gores bulging outward between the respective tendons 28'-34'. This design allows for reduced stress and strain on the balloon envelope 10, as the load is designed to be carried primarily by the tendons 28'-34', rather than the balloon envelope material in envelope gores 28-34.

Example Parachute Solutions

There are different solutions for employing a parachute in conjunction with the balloon envelope. Certain examples are provided in U.S. patent application Ser. No. 14/042,009, filed Sep. 30, 2013, which is entitled "Methods and Systems for Turning an Envelope Into a Parachute" and is incorporated by reference.

As noted above, aspects of the technology provide a prebuilt parachute overlying the surface of the balloon envelope to handle catastrophic envelope failures.

Figure 5A:
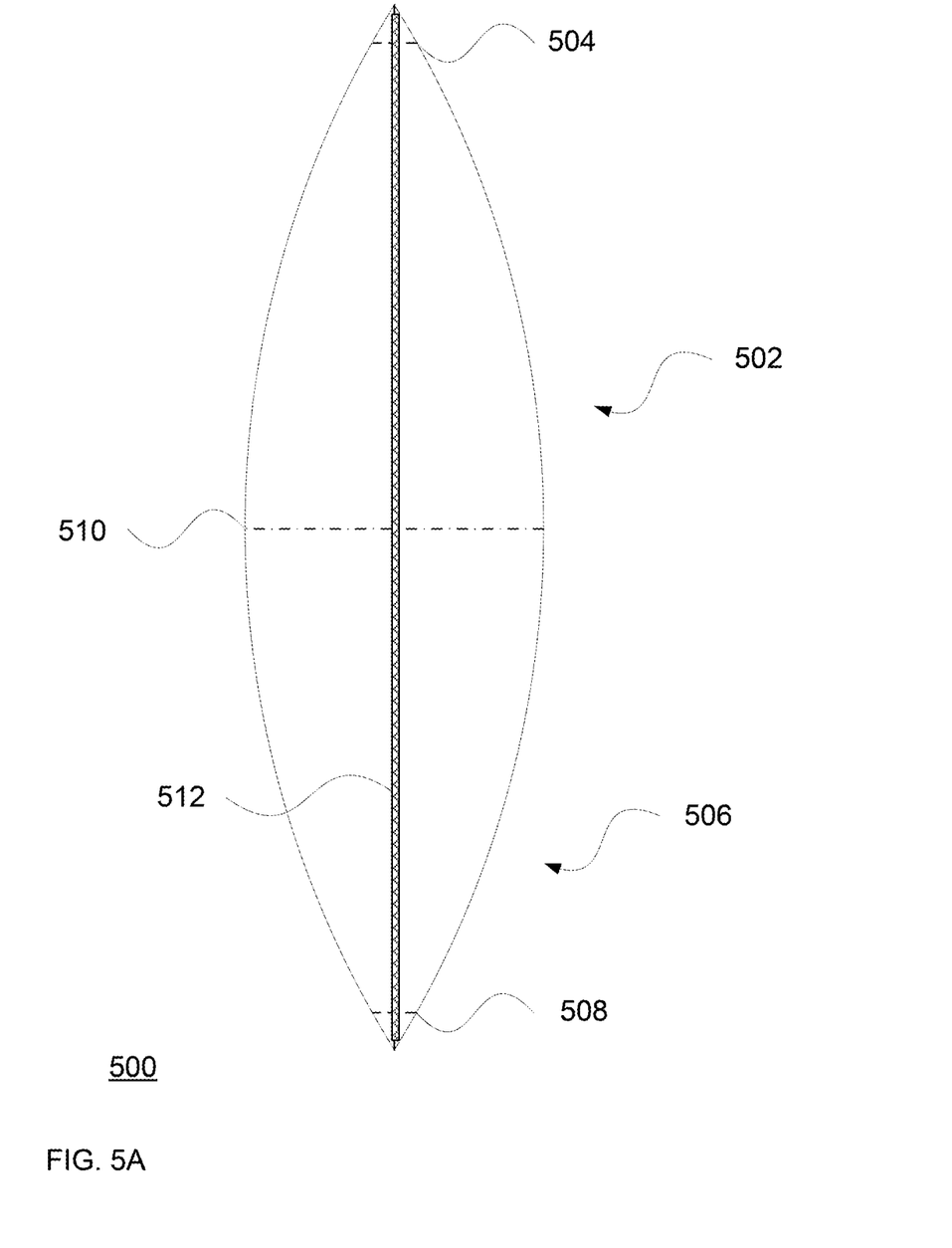
FIGS. 5A-B illustrates a gore member in accordance with aspects of the disclosure.

FIG. 5A illustrates an example gore 500 usable in the balloons described above. The gore 500 includes an upper portion 502 having an apex section 504 configured for connection to an apex load ring (not shown) positioned at the top of the balloon envelope, and a lower portion 506 having a base section 508 configured for connection to a base load ring (not shown) positioned at the bottom of the balloon envelope. For illustration purposes, an equator or centerline 510 is illustrated by the dotted-dashed line at the midpoint of the gore 500. Tendon (e.g., webbing or load tape) 512 is shown running longitudinally from the apex to the base of the gore 500. As noted above, the tendon is configured to provide strength to the gore section and to help withstand the load created by the pressurized gas within the envelope when the balloon is in use.

Figure 5B:
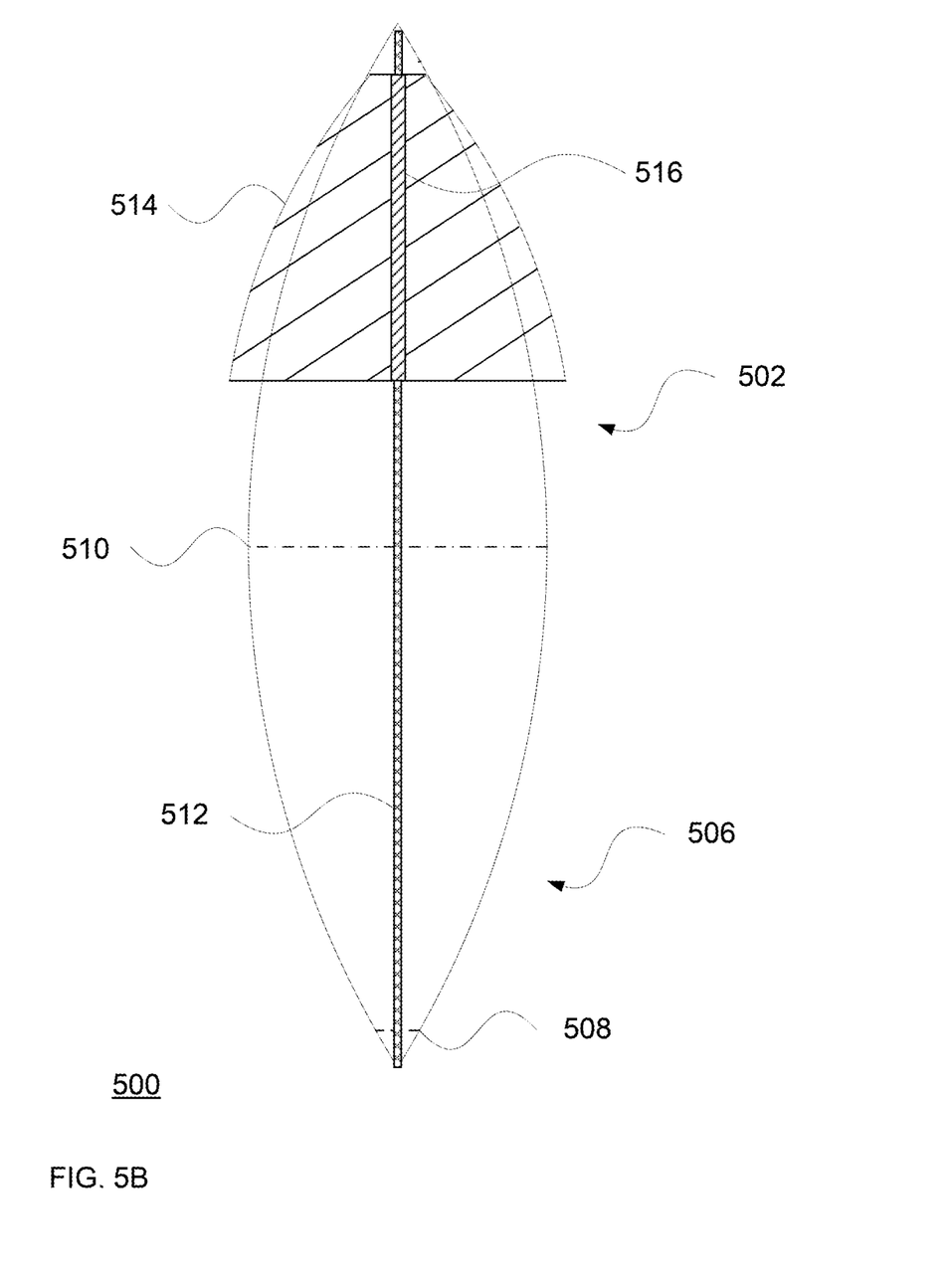

FIG. 5B illustrates a parachute segment 514 that is employed in conjunction with gore 500. As shown, the parachute segment 514 is secured to tendon 512. This may be done, for instance, by sewing the parachute segment's fabric onto the tendon 512, as shown by fastening section 516. The fastening section 516 may extend partly or entirely along the length of the parachute segment 514. Alternatively, the parachute segment 514 is secured to the tendon 512 by multiple fastening sections 516 distributed therealong.

Multiple parachute segments 514 may be connected together and affixed to some or all of the envelope's longitudinal tendons. Alternatively, the parachute may be formed of a single sheet of material that is sewn or otherwise affixed to the tendons.

Figure 6:
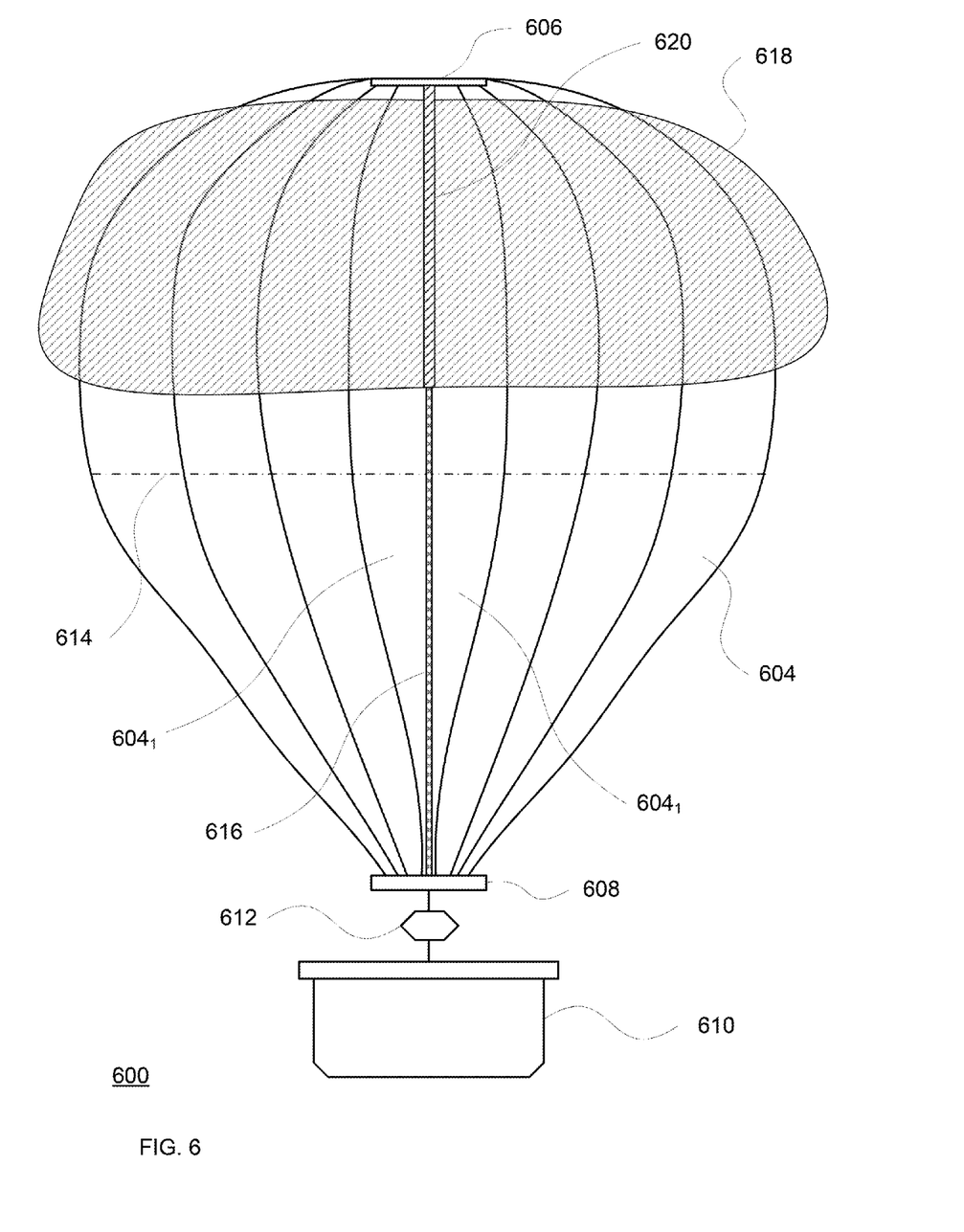
FIG. 6 illustrates a parachute and balloon envelope configuration in accordance with aspects of the disclosure.

FIG. 6 illustrates an example balloon and parachute system 600. As shown, the system 600 includes envelope 602 formed from a plurality of gores 604, which results in a pumpkin configuration when the envelope is inflated. The plurality of gores 604 terminate at the apex at top member 606 and at the bottom at base member or skirt 608. The balloon 600 also includes a payload 610 and may have a cut-down device 612. The equator 614 of the envelope is represented by a dotted and dashed line.

While each gore 604 may have a tendon overlying it, for the sake of illustration only gore 604$_1$ is shown with a tendon 616 in this figure. Parachute 618 overlies the envelope 602, and is illustrated showing the gore sections beneath it. As discussed above with regard to FIG. 5B, the parachute 618 is secured to some or all of the tendons 616, for example by being sewn onto the tendons 616 along corresponding fastening sections 620.

Choosing a suitable parachute arrangement may depend on several factors. These include whether, and how much, visible light is absorbed, providing sufficient infrared emissivity, and the overall size of the parachute. With regard to the latter factor, it is desirable to keep the parachute relatively small compared to the envelope to avoid heat issues. For instance, if the parachute were to cover most or all of the upper hemisphere of the envelope, it might result in excess heat being trapped within the envelope. This could adversely affect the operational stability of the balloon.

The size of the parachute may be chosen based on the appropriate system weight. Thus, in one example, the diameter of the parachute at its base may be on the order of five meters, for instance between about 3.5 and 7.5 meters. In this example, the length of the parachute from its top to the base may be approximately two meters, or between about 1.5 and 2.5 meters. It is possible to calculate the diameter or volume of the parachute that can be employed with the balloon system. In one example, the process assumes a round chute to have a coefficient of drag of 0.8, and then calculates for descent at "ground level". A target descent rate is selected, and then one may solve for the drag force to match the down force according to the following equation:

$$D = \sqrt{(8 * m * g)/(\pi * \rho * Cd(0.8) * v^2)}$$

where D is the parachute diameter, m is the mass of the balloon system, g is the gravitational constant, ρ is density of the atmosphere for terminal velocity, which is evaluated at 10,000 feet above sea level, Cd(0.8) is the coefficient of drag, and v is the desired terminal velocity (e.g., 7-8 meters per second).

As shown in FIG. 6, the parachute base does not extend below the envelope equator 614. This helps prevent the parachute from occluding the components in the payload 610. A top cutdown (not shown) can be employed to act as a stabilizing vent hole for the envelope in case of catastrophic failure.

As noted above, if the gore film fails, it will most likely occur at a point of highest strain, which is usually on the largest lobe at or near the equator of the envelope. And if a tendon overlying a gore snaps, the underlying gore will bulge out and the envelope may fail at or near the equator. Such failures may cause a tear longitudinally along the affected gore. The parachute is arranged in such a way that if the envelope film were to catastrophically fail, the rip or tear in the material would not transmit energy to the parachute resting on the envelope's surface. Similarly, in the event of a snapped tendon, the pre-deployed parachute would be able to withstand a single tendon failure due to its connection to other tendons.

The parachute 618 may be formed from nylon or polyester woven materials. However, the parachute material may be susceptible to ultraviolet (UV) degradation when aloft for long periods of time in the stratosphere. As the parachute needs to be capable of functioning for at least as long as the balloon envelope, e.g., 100 days aloft or more, the parachute material may be protected. One way of providing protection is to apply a coating to the fabric that reflects or blocks UV light, thereby extending the parachute's lifespan.

In one scenario, vacuum-deposited aluminum is applied as a coating to the outer surface of the parachute. Using such a coating may provide an additional benefit to the balloon system. In particular, it is possible that the envelope would not reach as high of a super-pressure during daytime operation. However, this may depend on the overall size of the parachute, and how much heat it causes the envelope to maintain. In turn, this would reduce envelope stress. The reduction in stress on the envelope can result in improved longevity. Alternatively, a thinner film thickness of the gore could be used. In other scenarios, other types of UV blockers or absorbers may be employed. These may coat the outer surface of the parachute, or may be applied as an additional layer over the parachute fabric. Other materials or compounds, such as hindered amine light stabilizers (HALS) may also be employed. HALS are derivatives of 2,2,6,6-tetramethyl piperidine. While HALS do not absorb UV light, they inhibit material degradation.

In a further scenario, the underside of the parachute may be made reflective, for instance using a reflective metallic layer. In one example, vacuum deposited aluminum may be used. This may be done so that at night, infrared (IR) light would pass through the top portion of the envelope film twice, thereby increasing the amount of energy the envelope absorbs at night. This, in turn would help keep the balloon system at float under colder conditions, and for longer, given an equivalent leak/permeation rate through the film.

Figure 7:
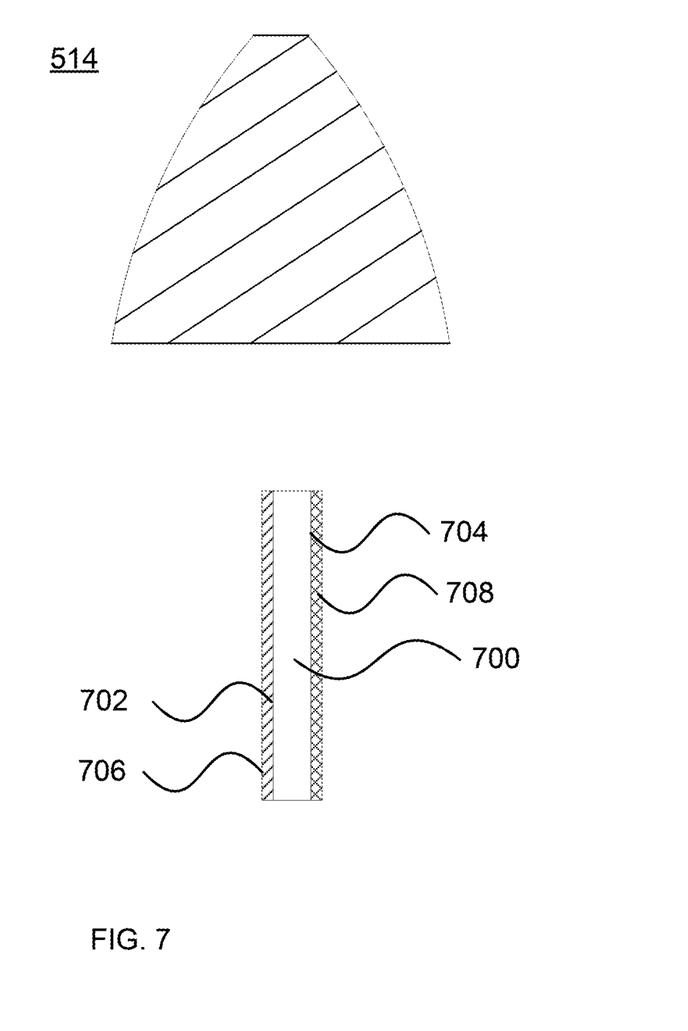
FIG. 7 illustrates a cross-section of a parachute in accordance with aspects of the disclosure.

FIG. 7 illustrates parachute segment 514 from FIG. 5B. This figure also shows a side, cross-sectional view of the parachute segment (not to scale). As shown, the parachute material 700 has a first surface 702 and a second surface 704. The first surface 702 is an outwardly facing surface, while the second surface is inwardly facing and is adjacent to the balloon envelope. As discussed above, a UV-protective material 706 coats or otherwise covers the outer surface 702. And an IR-reflective material 708 may be applied to or otherwise cover the inner surface 704.

Figure 8:
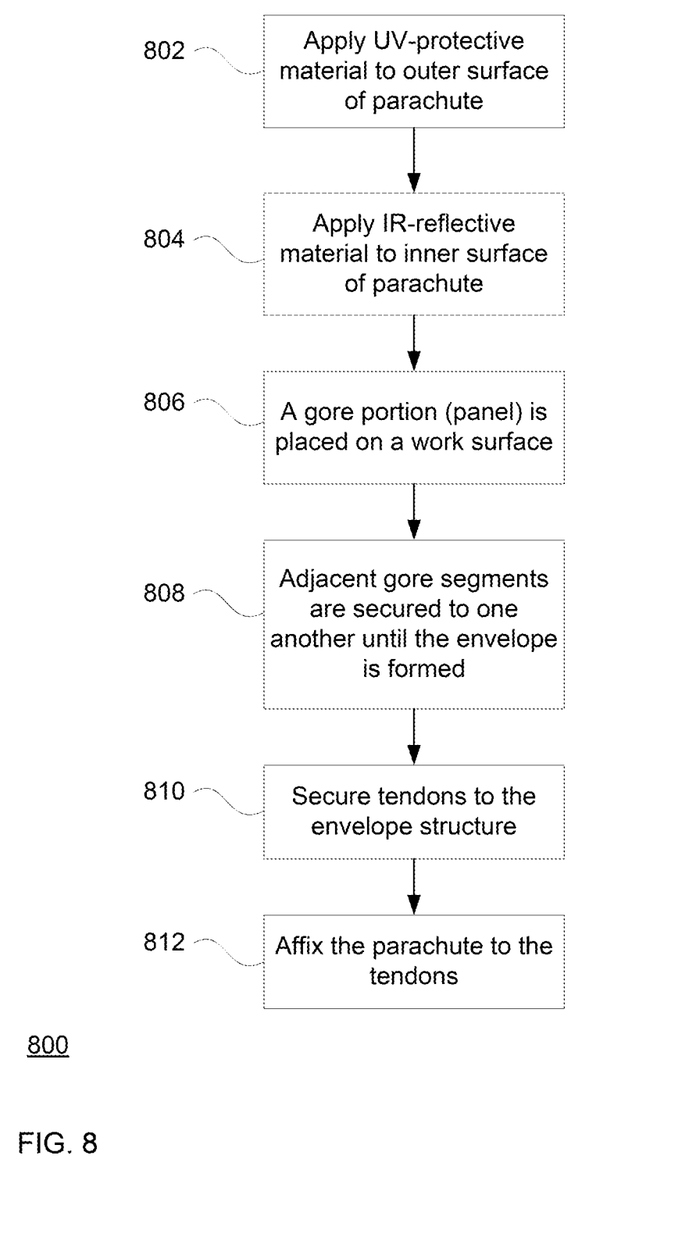
FIG. 8 is an example method of fabricating a balloon envelope with a pre-constructed parachute in accordance with aspects of the disclosure.

FIG. 8 is an example flow diagram 800 for manufacturing a balloon envelope with a preconfigured parachute as described above. As shown at block 802, a UV-protective material is applied to the outer surface of the parachute. As discussed above, the UV-protective material may be vapor-deposited aluminum. Alternatively, UV blockers, UV absorbers or a HALS material may be applied.

Optionally, as shown at block 804, an IR-reflective material may be applied to the inner surface of the parachute. The application of the IR-reflective material may also be done prior to applying the UV-protective material, or concurrently therewith. In a further example, the parachute material itself may have IR-reflective properties, in which case application of a separate material is unnecessary.

At block 806, an envelope gore portion (panel) is placed on a table, work surface or other work area. As an example, one or more gore panels may be placed on the work area at the same time. The gore panels are secured to one another to form the balloon envelope at block 808.

At block 810, the tendons are secured to the envelope structure. And at block 812, the parachute is affixed to the tendons. It is possible to affix the parachute to the tendons prior to or at the same time that the tendons are secured to the envelope structure. As discussed above, the parachute may be secured to some or all of the tendons, for example by being sewn thereto. The parachute may be formed from multiple segments or may be a single, continuous sheet of material that is sewn or otherwise affixed to the tendons.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A balloon structure, comprising:
    a plurality of gore panels affixed to one another to form a balloon envelope, each gore panel comprising a film, a first end of each gore panel terminating at a top member along an apex of the balloon envelope, and a second end of each gore panel terminating at a base member along a bottom of the balloon envelope, wherein the balloon envelope has an upper hemisphere, a lower hemisphere and an equator therebetween;
    a plurality of tendons, each tendon being positioned adjacent a corresponding one of the plurality of gore panels, each tendon being configured to carry a load caused by pressurized lifting gas within the balloon envelope; and
    at least one parachute segment affixed to at least one of the plurality of tendons on the upper hemisphere of the balloon envelope, the at least one parachute segment covering at least a portion of the upper hemisphere of the balloon envelope adjacent the apex thereof, wherein the at least one parachute segment does not extend below the equator of the balloon envelope.

2. The balloon structure of claim 1, wherein the at least one parachute segment is sewn onto the at least one of the plurality of tendons.

3. The balloon structure of claim 1, wherein an outer surface of the at least one parachute segment facing away from the balloon envelope includes a UV light-protective material.

4. The balloon structure of claim 3, wherein the UV light-protective material includes an aluminum coating.

5. The balloon structure of claim 3, wherein the UV light-protective material comprises a UV blocker or a UV absorber.

6. The balloon structure of claim 3, wherein the UV light protective material comprises a hindered amine light stabilizer.

7. The balloon structure of claim 3, wherein an inner surface of the at least one parachute segment arranged adjacent to the balloon envelope includes an IR-light reflective material.

8. The balloon structure of claim 7, wherein the IR light-reflective material on the inner surface of the at least one parachute segment is a reflective metallic layer.

9. The balloon structure of claim 8, wherein the reflective metallic layer is a deposited aluminum layer.

10. A method of manufacturing a balloon structure, the method comprising:
    preparing one or more gore panels on a work area, each gore panel comprising a film;
    securing adjacent gore panels to one another to form a balloon envelope, a first end of each gore panel terminating at an apex of the balloon envelope, and a second end of each gore panel terminating at a base of the balloon envelope, wherein the balloon envelope has an upper hemisphere, a lower hemisphere and an equator therebetween;

securing a plurality of tendons to the balloon envelope, each tendon being positioned adjacent a corresponding one of the plurality of gore panels, each tendon being configured to carry a load caused by pressurized lifting gas within the balloon envelope; and affixing at least one parachute segment to at least one of the plurality of tendons on the upper hemisphere of the balloon envelope, the at least one parachute segment covering at least a portion of the upper hemisphere of the balloon envelope adjacent the apex thereof, an outer surface of the at least one parachute segment facing away from the balloon envelope and an inner surface of the parachute being arranged adjacent to the balloon envelope, wherein the at least one parachute segment does not extend below the equator.

11. The method of claim 10, wherein the at least one parachute segment is affixed by being sewn onto the at least some of the plurality of tendons.

12. The method of claim 10, further comprising applying a UV light-protective material to the outer surface of the at least one parachute segment.

13. The method of claim 12, wherein the UV light-protective material comprises an aluminum coating.

14. The method of claim 13, wherein applying the UV light-protective material is done by vacuum depositing the aluminum coating onto the outer surface of the at least one parachute segment.

15. The method of claim 12, wherein the UV light-protective material comprises a UV blocker or a UV absorber.

16. The method of claim 12, wherein the UV light protective material comprises a hindered amine light stabilizer.

17. The method of claim 12, further comprising applying an IR light-reflective material to the inner surface of the at least one parachute segment.

18. The method of claim 17, wherein applying the IR light-reflective material is done by vacuum depositing an aluminum coating onto the inner surface of the at least one parachute segment.

19. The method of claim 12, wherein the inner surface of the at least one parachute segment incorporates an IR light-reflective material.

20. The method of claim 19, wherein the IR light-reflective material comprises a reflective metallic layer.

* * * * *